US008733256B2

(12) United States Patent
Kinzenbaw

(10) Patent No.: US 8,733,256 B2
(45) Date of Patent: May 27, 2014

(54) PLANTER WITH FOUR BAR LINKAGE

(75) Inventor: Jon E. Kinzenbaw, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 247 days.

(21) Appl. No.: 13/168,619

(22) Filed: Jun. 24, 2011

(65) Prior Publication Data
US 2011/0315410 A1 Dec. 29, 2011

Related U.S. Application Data

(60) Provisional application No. 61/358,785, filed on Jun. 25, 2010.

(51) Int. Cl.
A01C 5/00 (2006.01)
A01C 7/18 (2006.01)

(52) U.S. Cl.
USPC .............................. 111/52; 111/67

(58) Field of Classification Search
USPC .................. 111/52, 134–137, 200, 67, 68
See application file for complete search history.

(56) References Cited

U.S. PATENT DOCUMENTS

| 189,044 | A | * | 4/1877 | Kerschner | 111/63 |
| 2,593,679 | A | | 4/1952 | Kaupke | |
| 3,101,791 | A | * | 8/1963 | Van Londersele | 172/445 |
| 4,117,893 | A | * | 10/1978 | Kinzenbaw | 172/311 |
| 4,214,637 | A | * | 7/1980 | Applequist | 172/484 |
| 4,311,104 | A | * | 1/1982 | Steilen et al. | 111/194 |
| 4,696,349 | A | * | 9/1987 | Harwood et al. | 172/323 |
| 5,129,463 | A | | 7/1992 | Handy | |
| 5,232,054 | A | | 8/1993 | Van Blaricon | |
| 5,398,771 | A | * | 3/1995 | Hornung et al. | 172/311 |
| 5,488,996 | A | | 2/1996 | Barry | |
| 6,581,530 | B1 | * | 6/2003 | Hall et al. | 111/52 |
| 2002/0017389 | A1 | | 2/2002 | Moser et al. | |

FOREIGN PATENT DOCUMENTS

WO PCT/US2011/041895 6/2011

OTHER PUBLICATIONS

PCT Int. Search Report.

* cited by examiner

Primary Examiner — Alicia Torres
(74) Attorney, Agent, or Firm — McKee, Voorhees & Sease, P.L.C.

(57) ABSTRACT

An agricultural planter includes a frame and left and right wings pivotally attached to respective ends of the frame, all of which have a plurality of spaced row units. Each wing includes a forward bar pivotally coupled to the frame for forward folding for transport and an aft bar having row units attached thereto. Each aft bar is aligned parallel with and is pivotally coupled to its associated forward bar by at least one pair of first and second non-parallel coupling arms. A hydraulic cylinder coupled to the forward bar and to one of the pivoting arms raises the associated aft bar with row units above the soil to a first elevated position to facilitate turning the planter. Further extension of the hydraulic cylinder causes additional elevation, and substantial rotation of the aft bar and row unit combination to provide a low and narrow planter profile for transport and storage.

16 Claims, 18 Drawing Sheets

PLANTER WITH FOUR BAR LINKAGE

RELATED APPLICATIONS

This application claims the benefit of U.S. Provisional Application No. 61/358,785 filed on Jun. 25, 2010 for "PLANTER WITH FOUR BAR LINKAGE", which is hereby incorporated in its entirety by reference.

FIELD OF THE INVENTION

The present invention relates generally to agricultural planters having a main frame and a center section and left and right wing sections each having a plurality of spaced row units and pivotally attached to the main frame, and is particularly directed to a four bar linkage arrangement wherein each wing which uses the same lift components and hydraulics for raising the row units to an intermediate position for field turns and for fully raising and rotating the row units to provide a low and narrow planter profile for transport and storage.

BACKGROUND OF THE INVENTION

As the power of tractors and agricultural efficiency has increased, agricultural implements such as planters have increased in span, or width, to accommodate larger numbers of individual row units. Large planters generally include a main frame having a forward hitch assembly for drawing by a tractor and left and right wing sections pivotally attached to opposed lateral ends of the main frame. The pivoting wing connections allow the wings to fold relative to the main frame for transport and storage of the planter. Early planters pivotally displaced the wings vertically to reduce planter width and provide clearance for transport through narrow spaces. However, as the size of planters has increased, planter wings are generally folded in a forward direction to accommodate longer planter wings. This evolution has necessitated the incorporation of telescoping hitch assemblies to accommodate planter wings of increased length.

It is necessary to raise the planter frame on-the-go during operation in a field in order to elevate the row units above the soil. For example, at the end of a row of planted seed, dispensing of seed is interrupted temporarily while the tractor and planter combination typically executes a 180° turn to initiate planting of a follow-on row of seed, whereupon the row units are lowered on-the-go to the use position for again engaging the soil. It is also necessary to raise the planter unit and attachments for transport to provide adequate clearance between the row units and the roadway. It is desirable to have the same system and components control the height of the planter unit and its associated row units for field use as well as for transport and storage for design reasons as well as for increased efficiency and reduced cost.

SUMMARY OF THE INVENTION

The invention in one form is directed to an agricultural planter, including a main frame having a forward hitch assembly adapted for coupling to a traction vehicle; a center section pivotally coupled to an aft portion of the main frame and having first plural, spaced row units attached thereto; left and right wing sections pivotally attached to and extending outwardly from respective left and right portions of the main frame and having respective second and third plural, spaced row units attached thereto. The left and right wing sections are adapted for forward pivoting displacement for transport of the planter, wherein each wing section includes respective forward and aft linear, elongated, parallel bars, and wherein each forward bar is pivotally coupled to the main frame and each wing further includes respective first and second arms pivotally coupling its forward and aft bars. A lift arrangement is coupled to one of the arms in each of the left and right wing sections for independently raising the aft bar in each of the left and right wing sections and associated row units to a first position above the soil to facilitate turning of the planter on-the-go in a field, and for further lifting and substantially rotating the aft bar and associated row units of each wing section to a second position when the wing sections are folded forward for providing a low and narrow planter profile for transport.

The invention in another form is directed to a method for progressively lifting and rotating row units, the method comprising: substantially lifting and minimally rotating said row units from a planting position to a partially raised position to facilitate turning in the field; and further lifting and substantially rotating said row units from the partially raised position to a fully upraised position to facilitate transport of the planter.

BRIEF DESCRIPTION OF THE DRAWINGS

The appended claims set forth those novel features which characterize the invention. However, the invention itself, as well as further objects and advantages thereof, will best be understood by reference to the following detailed description of an embodiment taken in conjunction with the accompanying drawings, where like reference characters identify like elements throughout the various figures, in which:

DETAILED DESCRIPTION

Figure 1:
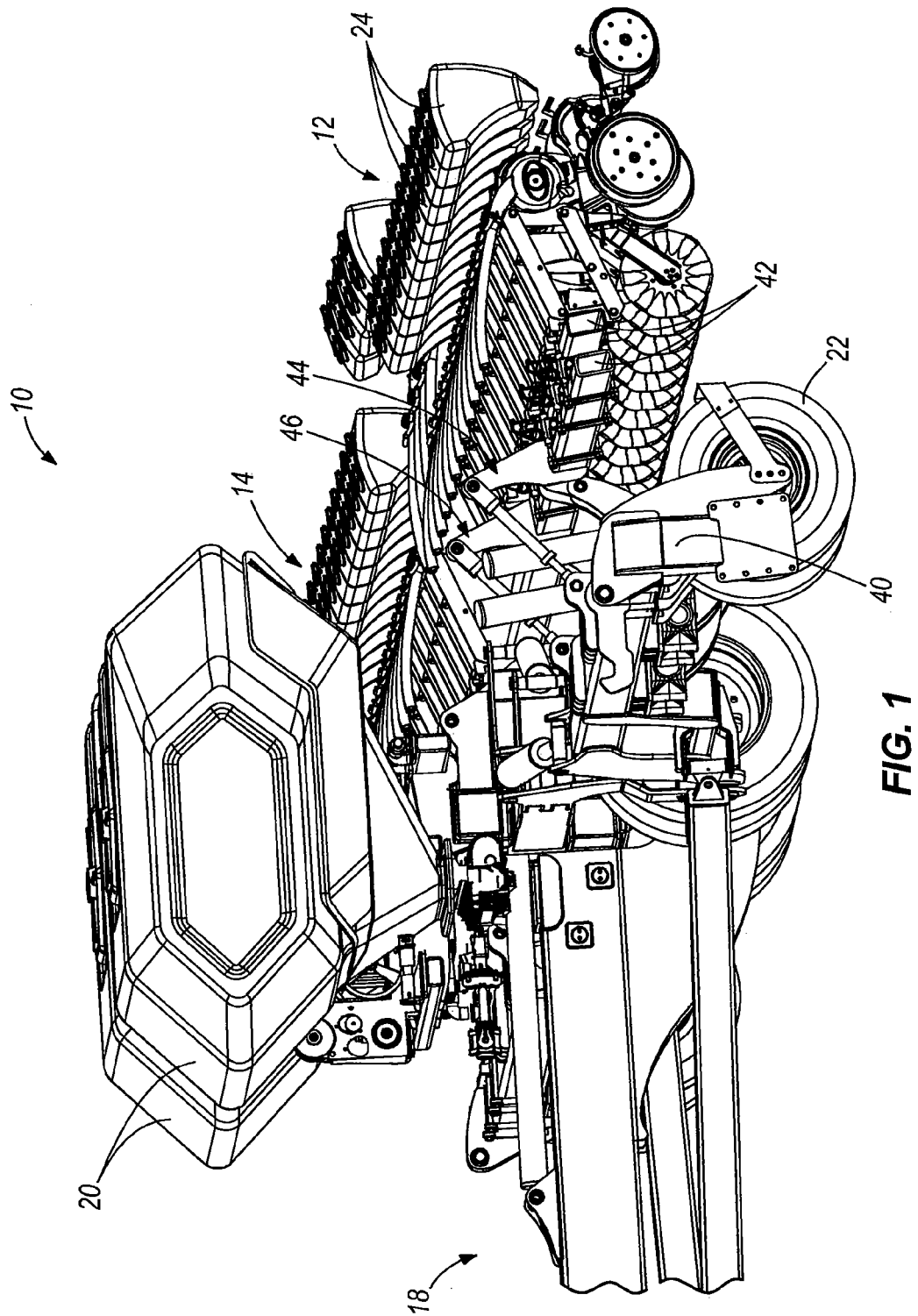
FIG. 1 is a front perspective view of an agricultural planter in accordance with the present invention with its left wing and associated row units in a partially elevated position.
Figure 2:
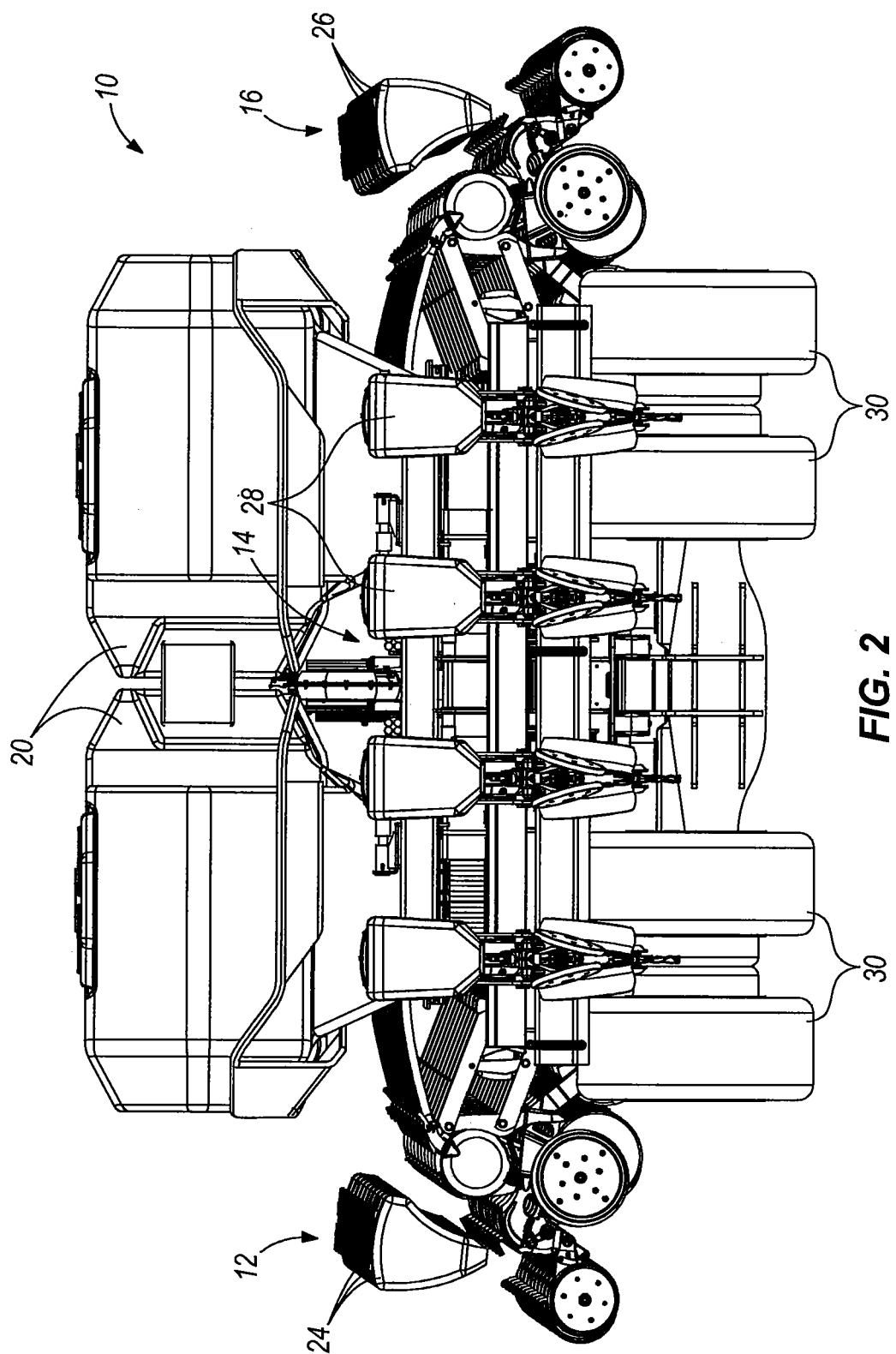
FIG. 2 is an aft plan view of the agricultural planter showing its left and right wings partially elevated and folded forward in the transport position.
Figure 3:
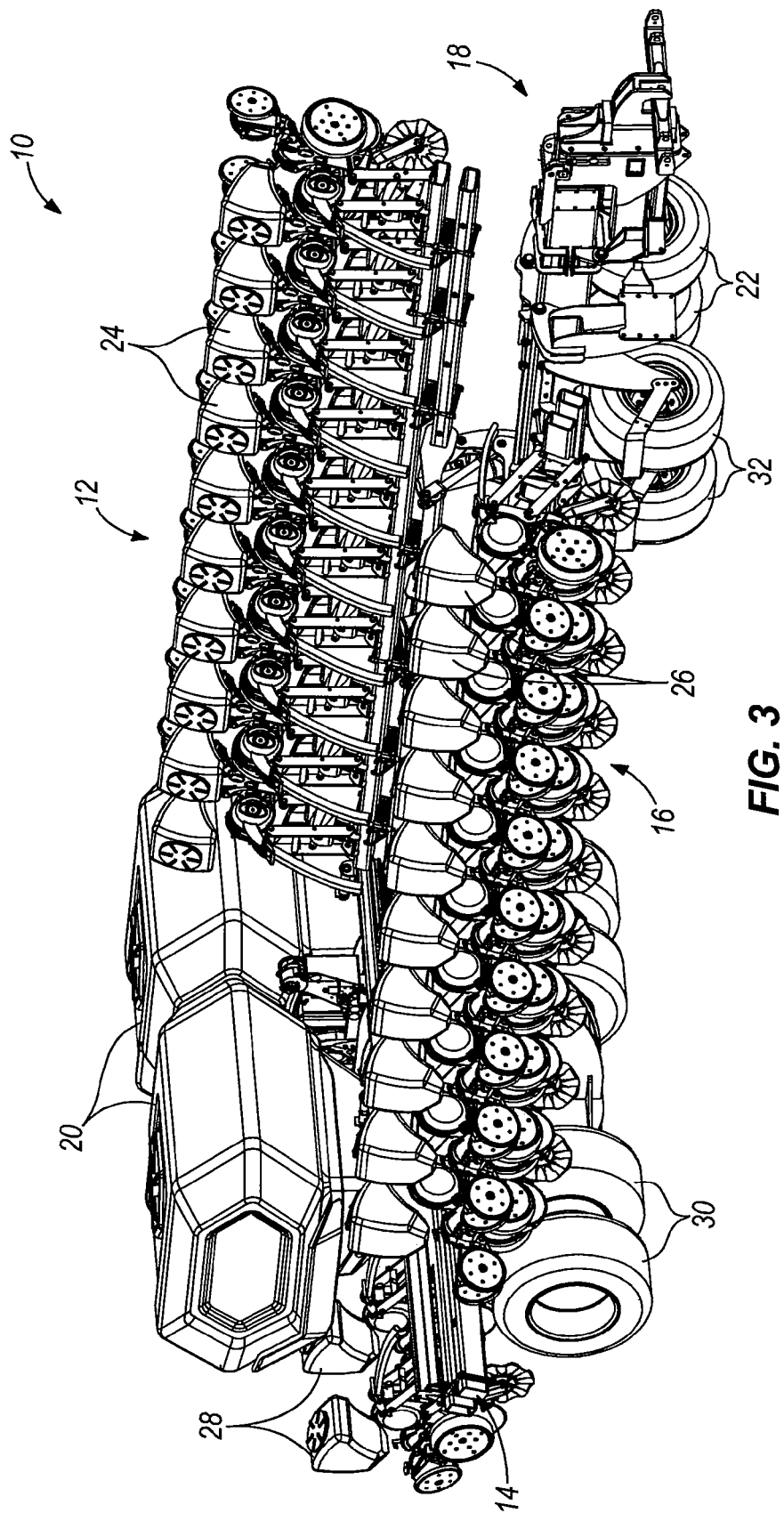
FIG. 3 is a front perspective view of the agricultural planter of FIG. 1 showing its left and right wings in the forward folded transport position, with its left wing also in the fully upraised and rotated position.
Figure 4:
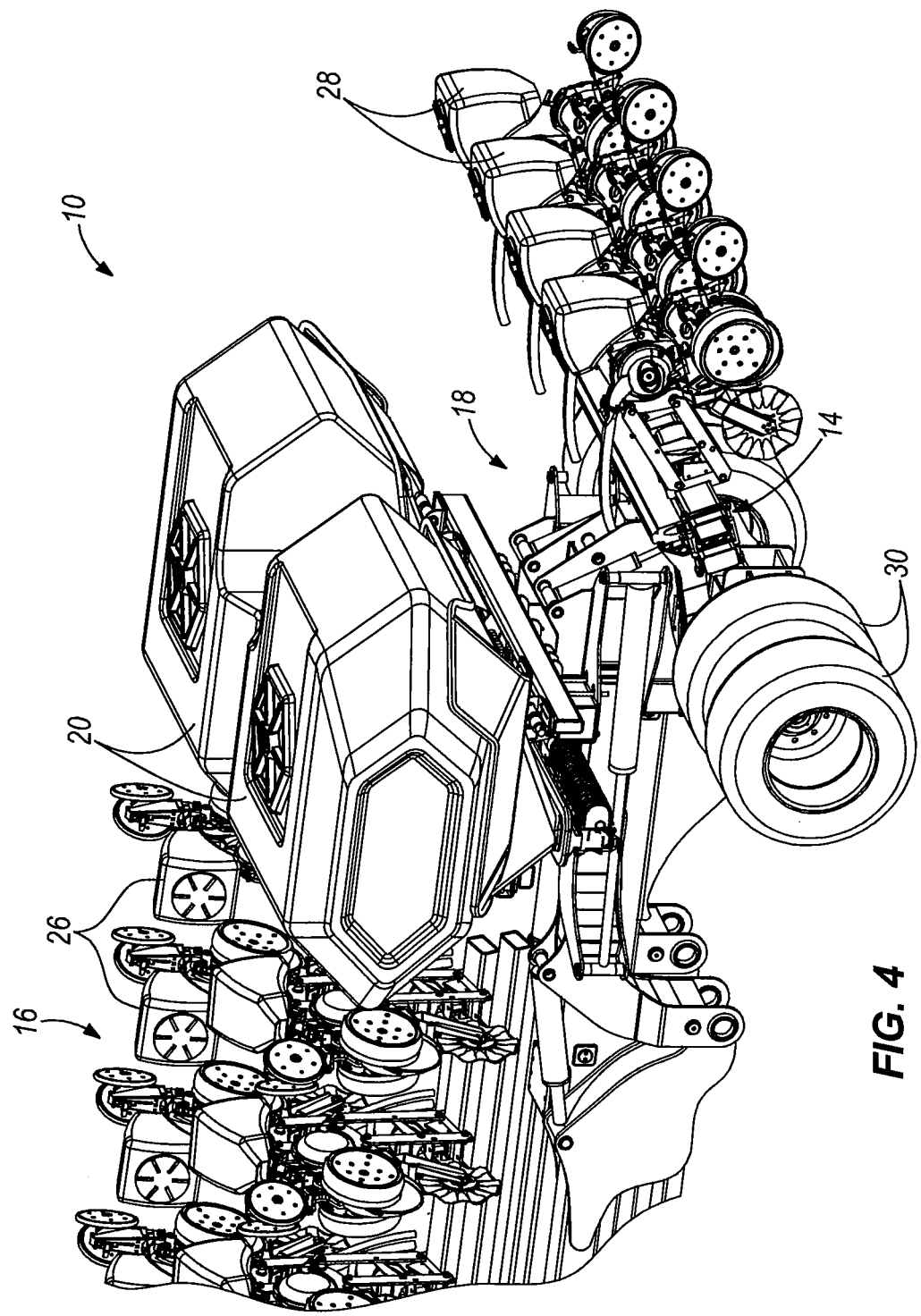
FIG. 4 is an upper rear perspective view of the agricultural planter showing its left and right wings in the forward folded transport position as well as in the fully upraised and rotated position.

Referring to FIGS. 1-4, there is shown an exemplary planter 10 in accordance with the principles of the present invention. Planter 10 includes a main frame 18 mounted to and supported by four wheels 30, where all four wheels are shown in FIG. 2. Disposed on a forward end portion of main frame 18 is a hitch assembly, which is shown but not numbered in FIG. 3. The hitch assembly is adapted for secure coupling to a towing vehicle, such as a tractor. Planter 10 also includes a left wing 12, a center section 14 and a right wing 16, where the terms left and right are used in relation to the direction of travel of the planter 10 during use in a field or during transport. As seen in FIG. 4, the center section 14 is disposed on an aft end portion of main frame 18 and includes spaced row units 28 attached thereto by way of a conventional parallel linkage. Left and right wings 12, 16 are similarly provided with spaced row units 24, 26. Each row unit 24, 26, 28 is conventional in design and operation and would typically include furrow forming wheels, a seed dispensing arrangement with a discharge tube, furrow closing wheels, gauge wheels, as well as additional options used in the planting process. The present invention is not limited to the number of row units, nor to the specific arrangement of the row units shown in the figures.

Center section 14 is pivotally attached to the aft end portion of main frame 18 and can be raised and lowered by a pair of primary hydraulic cylinders that cause the center section 14 to be raised on the aft end portion of main frame 18. As shown in FIG. 4, the center section 14 can be raised to a height of approximately 22" above its normal operating height during planting to facilitate on-the-go turning in the field or transport of the planter. The two aforementioned hydraulic cylinders are not illustrated in detail in the drawings as the configuration, positioning and operation are conventional and well known.

Left and right wings 12, 16 are similar to one another in design, operation and the manner in which they are pivotally attached to the planter's main frame 18. Thus, the following detailed description of the planter 10 addresses primarily the design and operation of only the left wing 12 for the sake of brevity.

Figure 5:
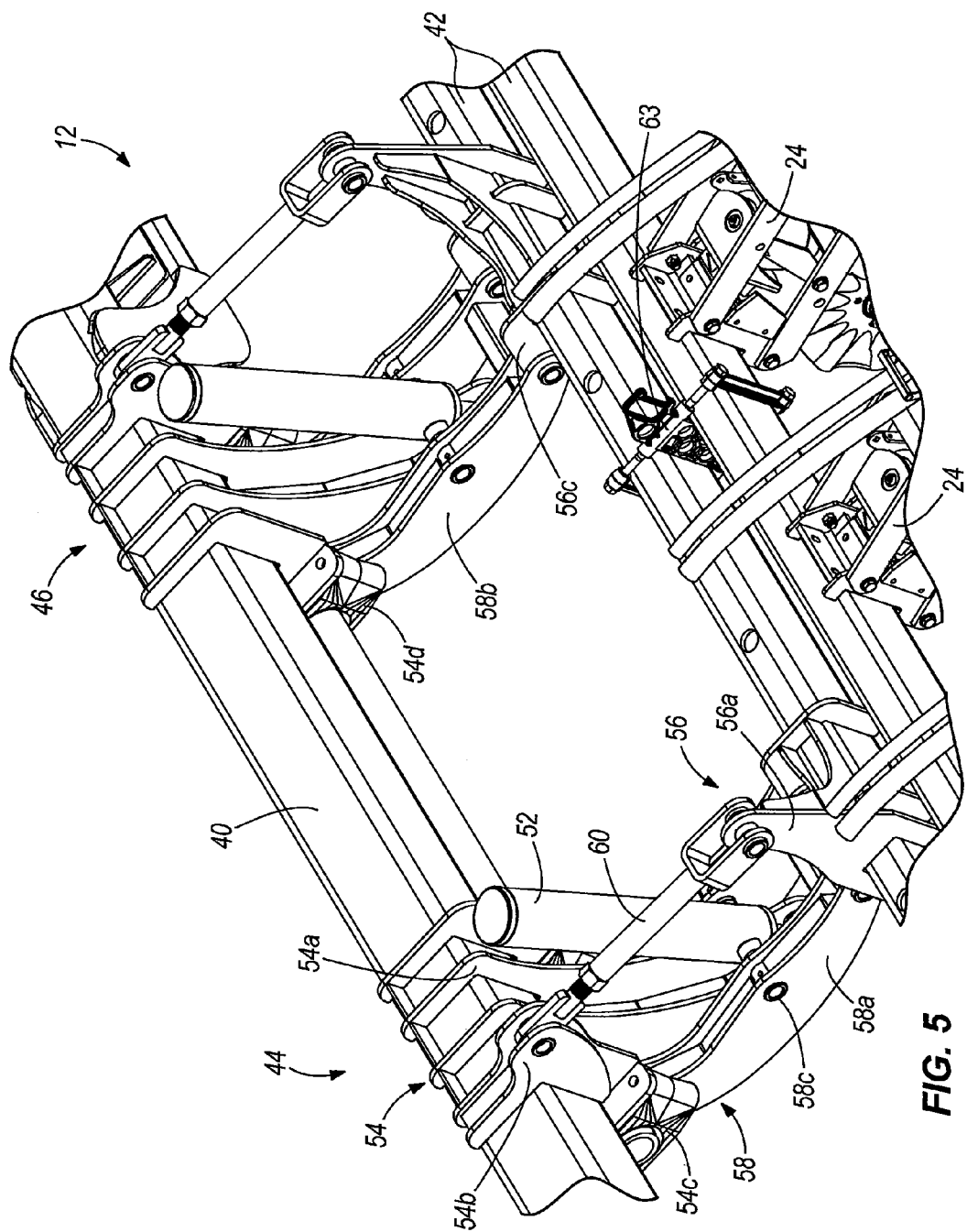
FIGS. 5 and 6 are perspective views of a portion of the frame of the planter illustrating the pivoting connections, respectively, between a forward bar connected to the planter's main frame and an aft bar to which plural spaced row units are mounted.

Each of the left and right wings 12, 16 includes the combination of a respective forward bar and a respective aft bar, where the left wing forward bar is shown as element 40 and its associated aft bar is shown as element 42 in FIG. 1, as well as in the upper, rear perspective view of a portion of the left wing 12 shown in FIG. 5. It can be appreciated by one of ordinary skill in the art, that aft bar 42 can be one bar or a plurality of elongated members arranged side-by-side or end-to-end and mounted or clamped together. In one embodiment, and as seen in FIG. 5, a pair of elongated members is clamped together using a clamp 63, which allows for greater flexibility in the attachment and spacing of row units.

An inner end portion of the forward bar 40 of left wing 12 is pivotally connected to a respective left outer portion of the main frame 18 allowing the left wing 12 to be rotated about a vertical axis in forward and aft directions relative to the main frame 18 in a conventional manner such as by means of hydraulic cylinders for configuring the planter 10 for transport or for use in a field. Right wing 16 is similarly pivotally attached to a respective right outer portion of the main frame 18, and rotated about a vertical axis in the same conventional manner. Referring to FIG. 3, an outer end portion of the left wing 12 is supported by a first pair of wheels 22. Similarly, an outer end portion of the right wing 16 is supported by a second pair of wheels 32. Wheels 22 and 32 may be fixed at respective left and right wing outer portions, or may be longitudinally slidable along left and right wings 12, 16 respectively.

Referring again to FIG. 5, additional details of the connection of the forward and aft bars 40, 42 are shown. Forward bar 40 is pivotally coupled to aft bar 42 by means of an outer coupler 44 and an inner coupler 46. The inner coupler 46 mirrors the outer coupler 44 in configuration and is the same in operation. It should also be noted that for most applications, only one coupler of the type of the outer and inner couplers 44, 46 may be necessary for proper operation of the left and right wings 12, 16.

Outer coupler 44 includes a first coupling bracket 54 securely attached to forward bar 40. Outer coupler 44 further includes a second coupling bracket 56 securely connected to aft bar 42. First and second coupling brackets 54, 56 may be fixedly connected to a respective forward or aft bar 40, 42 by conventional means such as nut and bolt combinations or by weldments. Outer coupler 44 further includes nonparallel first and second arms 58, 60.

Figure 6:
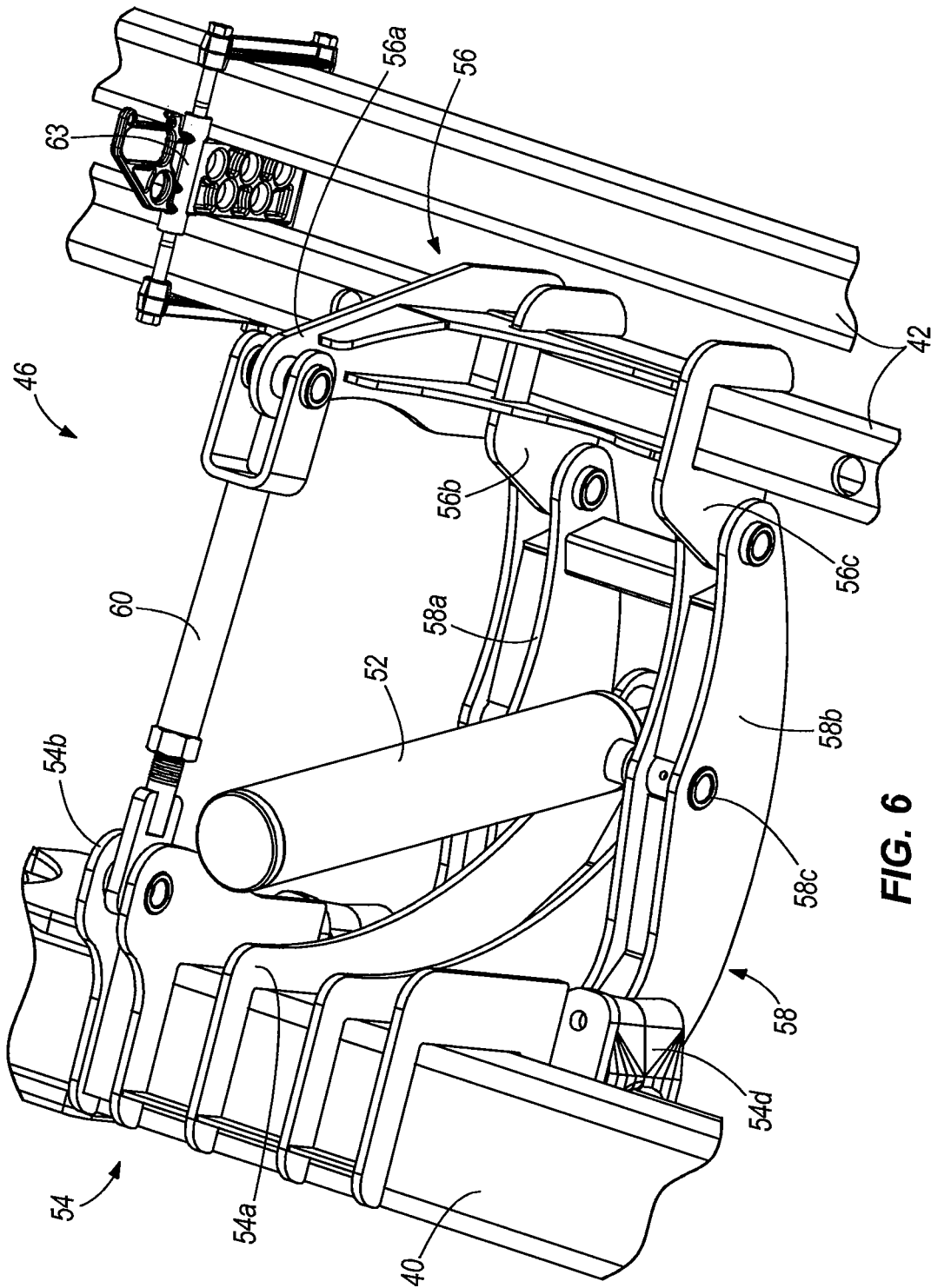

As shown in FIGS. 5 and 6, first coupling bracket 54 comprises an arcuate support member 54a extending downwardly and mounts 54b, 54c and 54d. Second coupling bracket 56 comprises an upwardly extending arm 56a and mounts 56b and 56c. The first and second arms 58, 60 are each provided with respective apertures on their forward and aft ends. This permits the forward end of the first and second arms 58, 60 to be securely coupled in a pivoting manner to the first coupling bracket 54 by means of a nut and bolt combination. Similarly, aft ends of the first and second arms 58, 60 are securely coupled in a pivoting manner to the second coupling bracket 56 by means of a nut and bolt combination as shown in FIG. 5. It can be appreciated by one of ordinary skill in the art, that while first and second arms 58, 60 are described herein as being coupled to first and second coupling brackets 54, 56 by means of a nut and bolt combination, any similar coupling will suffice so long as first and second arms 58, 60 are coupled to first and second coupling brackets 54, 56 in a pivoting manner.

First arm 58 is generally arcuate and may be comprised of one or more members. In one embodiment, shown in FIGS. 5 and 6, the first arm 58 comprises a pair of members 58a and 58b. Members 58a and 58b are coupled at their forward ends to a lower portion of first coupling bracket 54 at mounts 54c and 54d (shown on inner coupler 46). Members 58a and 58b are coupled at their aft ends to a lower portion of second coupling bracket 56 at mounts 56b and 56c. Second arm 60 is connected at its forward end to an upper portion of first coupling bracket 54 at mount 54b and at its aft end to an upper portion of second coupling bracket 56 at upwardly extending arm 56a. Second arm 60 can be a turnbuckle as seen in FIG. 5 or, as can be appreciated by one of ordinary skill in the art, it can be any other connecting means sufficient to guide and support the rotation of aft bar 42 as described later herein. Each of the first and second arms may be comprised of a high strength metal. The first and second coupling brackets 54, 56 in combination with first and second arms 58 and 60 pivotally connect the forward and aft bars 40, 42 to allow the aft bar 42 to be pivotally displaced vertically with respect to the forward bar 40. In the present embodiment, outer coupler 44 is shown with a single second arm 60 and members 58a, 58b comprising lower first arm 58, however, outer and inner couplers 44, 46 will operate equally as well with one or two second arms and with one or two first arms (as described previously).

Figure 7:
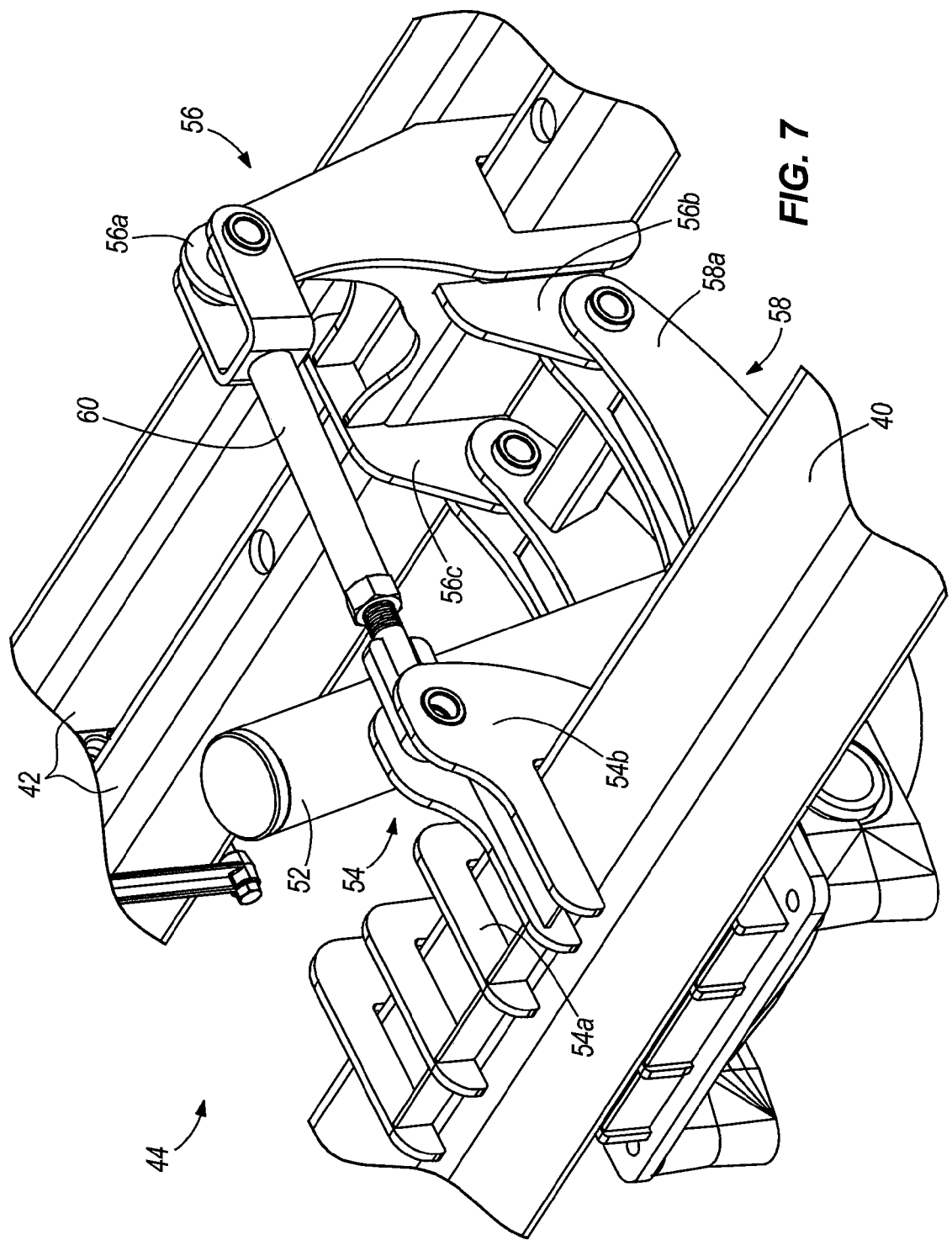
FIGS. 7 and 8 are close-up aft and forward perspective views, respectively, of the pivoting coupling between forward and aft bars, where the row units are shown in the soil engaging, planting position and in a fully upraised and rotated position.
Figure 8:
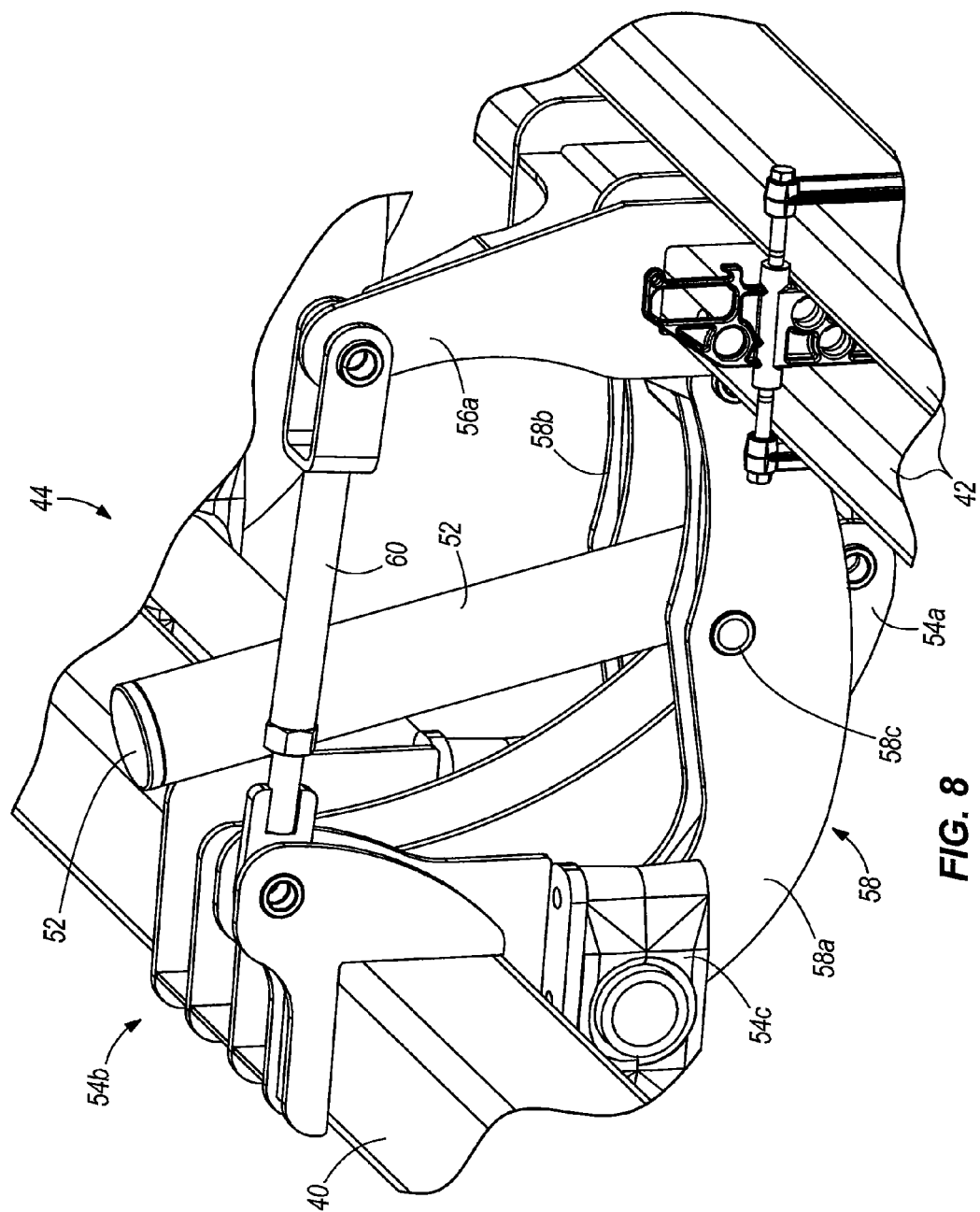

As seen in FIGS. 7 and 8 the coupling between the outer coupler 44 and the forward and aft bars 40, 42 is shown with the planter's row units in the soil engaging, planting position. Outer coupler 44 is connected to a hydraulic cylinder 52, which is shown in a non-extended configuration in FIGS. 6, 7 and 8. Hydraulic cylinder 52 is connected at its rod end to arcuate support member 54a, which extends downwardly away from first coupling bracket 54 and forward bar 40. Hydraulic cylinder 52 is further connected to a central portion of lower first arm 58 by means of pivot connection 58c. In this embodiment, the hydraulic cylinder 52 is positioned between the forward and aft bars 40, 42 and is mostly vertical with a lean towards the forward bar 40. Although this embodiment of the invention is illustrated and described as having hydraulic cylinder 52 coupled to lower arm 58, it may alternatively be connected to upper arm 60 rather than to the lower arm. Furthermore, it can be appreciated by one of ordinary skill in the art that the hydraulic cylinder 52 may be positioned between the forward and aft bars 40, 42 to be entirely vertical or with a slight lean towards the aft bar.

Referring to FIGS. 9-12, there is shown a series of side elevation views of the planter 10 of the present invention illustrating the sequence of positions and orientations assumed by the left wing 12 and its components during the raising of the row units 24 from their position during field operation to a fully upraised and rotated position for transport. It should also be noted that in FIGS. 9-12, the left wing 12 and its associated row units 24 are aligned generally transverse to the main frame and that an outer wing and associated row units would normally be moved to the fully upraised and rotated position with the outer wing folded to a position in closely spaced relation to the planter's main frame 18 for transport as shown in FIG. 4.

Figure 9:
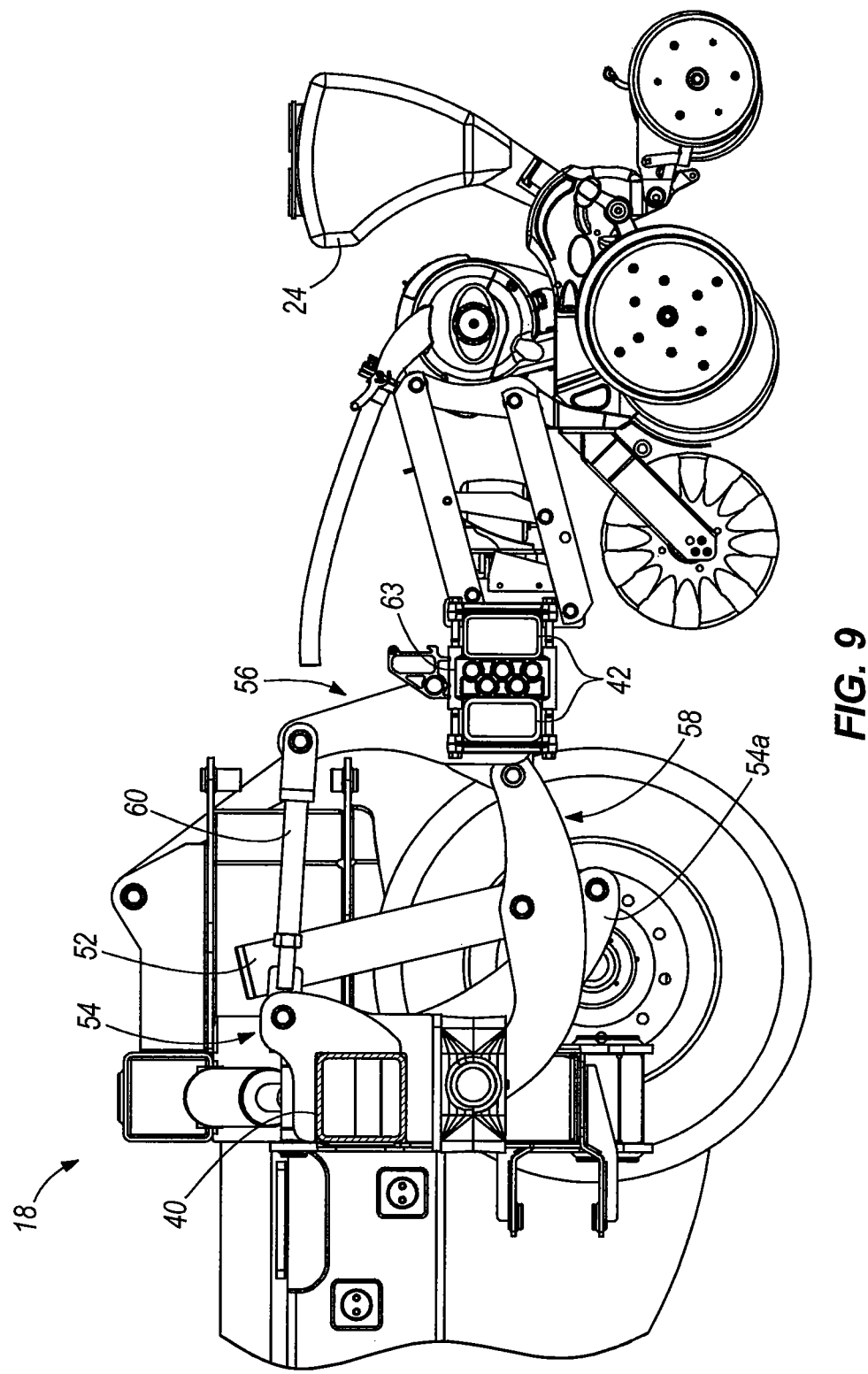
FIGS. 9-12 are a sequence of side elevation views showing different positions and orientations of the aft bar and row units shown in FIGS. 6 and 7 during elevation of the aft bar and row units from the lower, field engaging position to the fully upraised and rotated position for transport of the planter.
Figure 10:
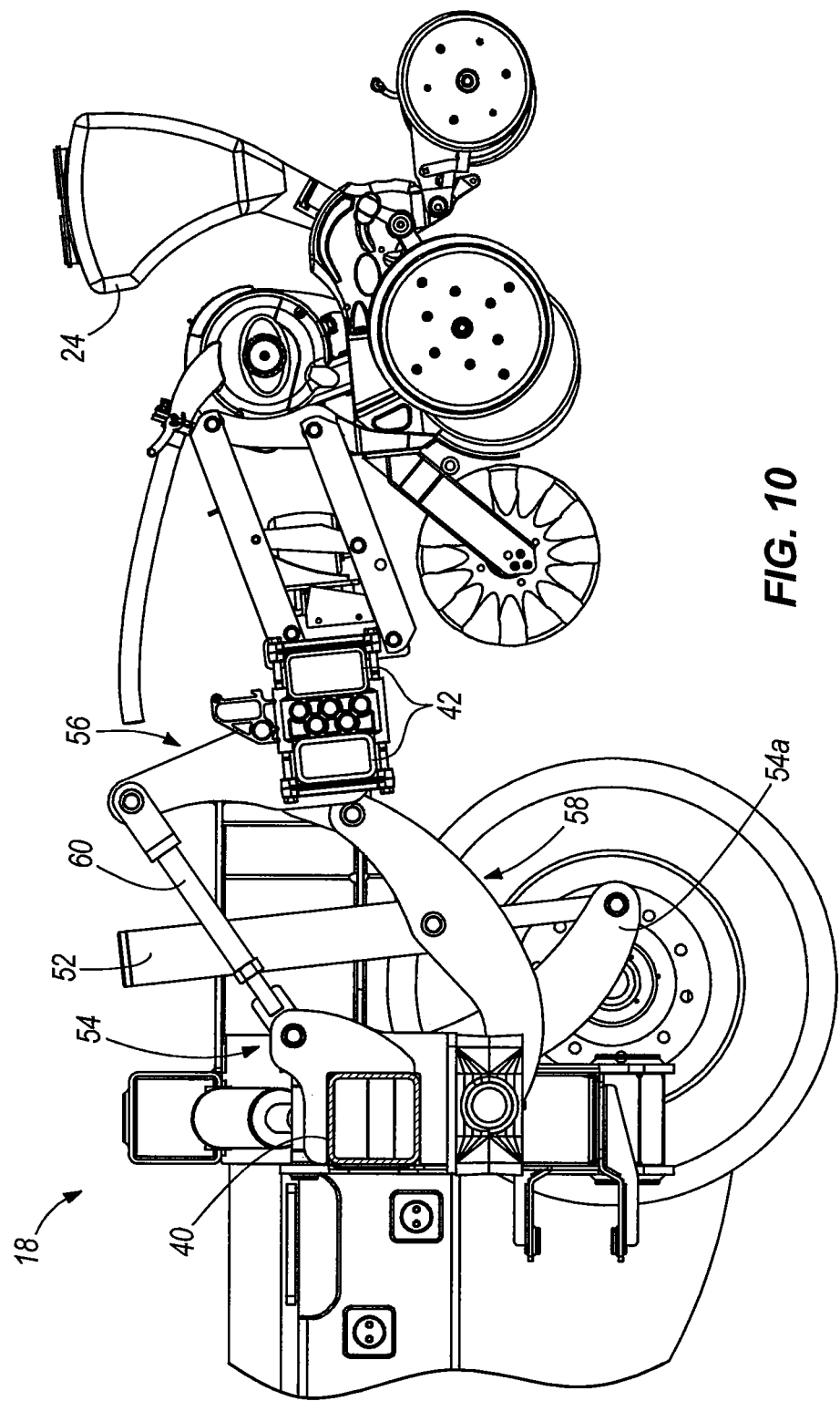

Referring now to FIG. 9, the row units 24 are shown aligned generally horizontally as in the ground engaging, planting position. Aft bar 42 is aligned generally horizontally with, and rearward of, forward bar 40. Several of the aforementioned implements of the planter's unit 24 engage the ground in the planter's use position shown in FIG. 9. Shown in FIG. 10 is a first upraised position, wherein hydraulic cylinder 52 has begun to extend resulting in raising of aft bar 42 and the row units 24 attached thereto. In this position, the row units 24 may be elevated anywhere from 5"-30" above the soil. In the exemplary embodiment shown in FIG. 10, the row units are approximately 20"-24" above the soil and the first and second arms 58, 60 have been rotationally displaced about their respective pivot points in the outer coupler 44 in a counter clockwise direction. It can also be seen that aft bar 42 has undergone limited rotation in a counterclockwise direction relative to forward bar 40 and thus is minimally inclined. In an exemplary embodiment, the aft bar 42 is inclined at an angle of approximately 5° relative to horizontal. However, it can be appreciated by a skilled artisan that with minor modifications the angular displacement of the aft bar 42 can be as low as 1° relative to horizontal. At this angle of inclination, there is no danger of seed being discharged from the row units 24. It will be appreciated by one of ordinary skill that in the present embodiment, row units 24 are shown in a locked position, and thus restrained for vertical movement about the aft bar 42 via the conventional parallel linkage, and that if the row units 24 were unlocked, raising the row units 24 for turning or transport would cause the row units 24 to drop downwardly until restrained by the parallel linkage. Put another way, if the row units 24 of FIG. 9 were unlocked when moving from a planting position to a first position for turning in a field, the aft bar 42 would raise several inches before the row units 24 begin to raise. After the "travel" is gone, the parallel linkage would restrain the row units 24 and point generally downward from the aft bar 42 to the row units 24. This is opposite of what is shown in FIG. 9 wherein the row units are locked and thus pointing upwardly from the aft bar 42 to the row units 24. Regardless of whether the row units are locked, first and second arms 58, 60 are non-parallel and thus the aft bar 42 traverses a path similar in geometry to one branch of a hyperbola, the curvature of which varies with the position of the aft bar 42 on the arc. The aft bar 42 is progressively, rotationally displaced as it traverses this generally hyperbolic curve. At this point in the upward displacement of the aft bar 42, with the pivot axes of the first and second arms 58, 60 disposed in spaced relation and generally non-parallel with one another, the aft bar 42 primarily undergoes linear displacement with very limited rotation. With the ground engaging implements of the row units 24 raised to a height of 20"-24" above the soil, the planter 10 can be turned 180° in a field such as at the end of a planted row of seed to initiate planting of another seed row.

Figure 11:
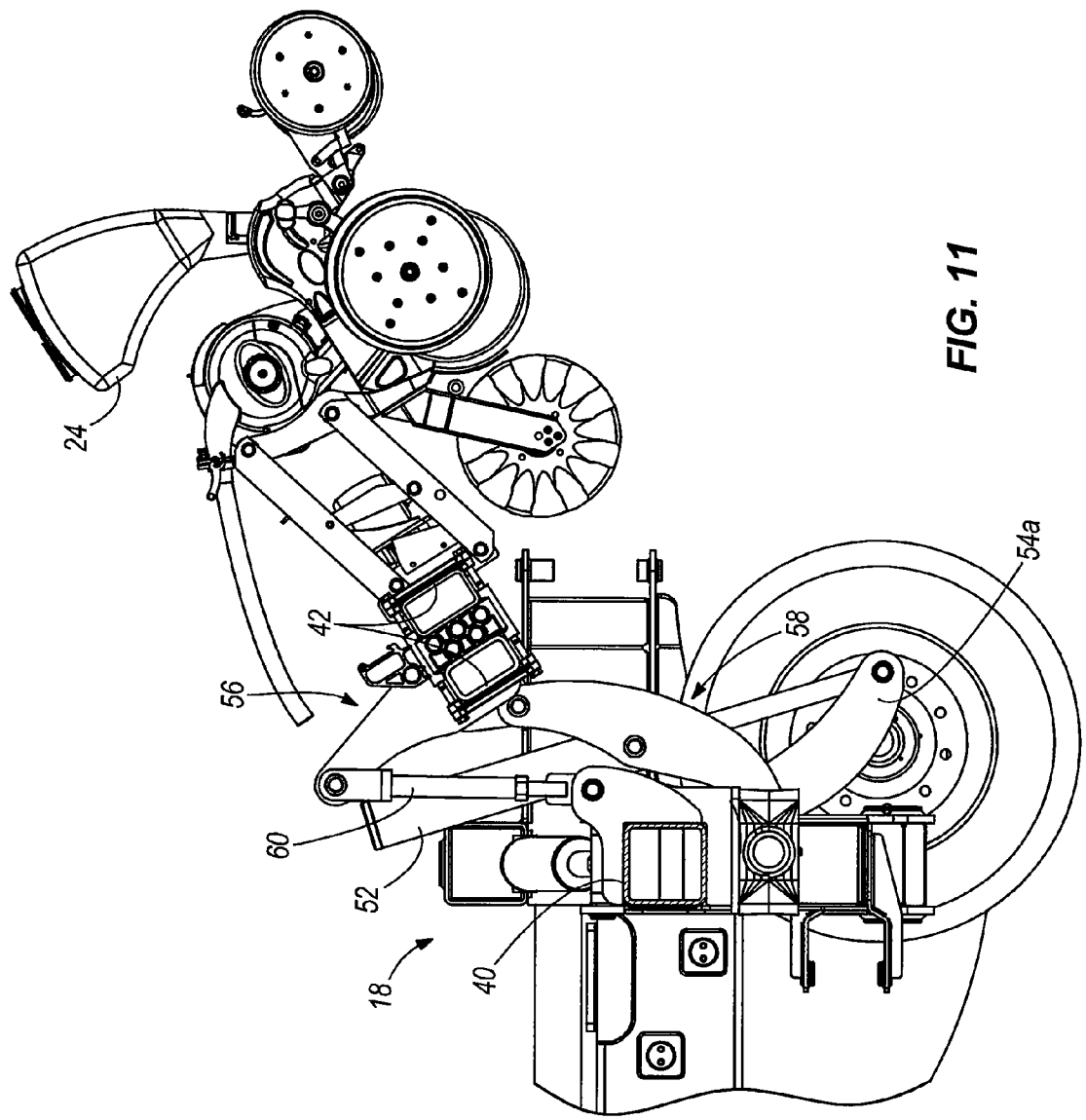
Figure 12:
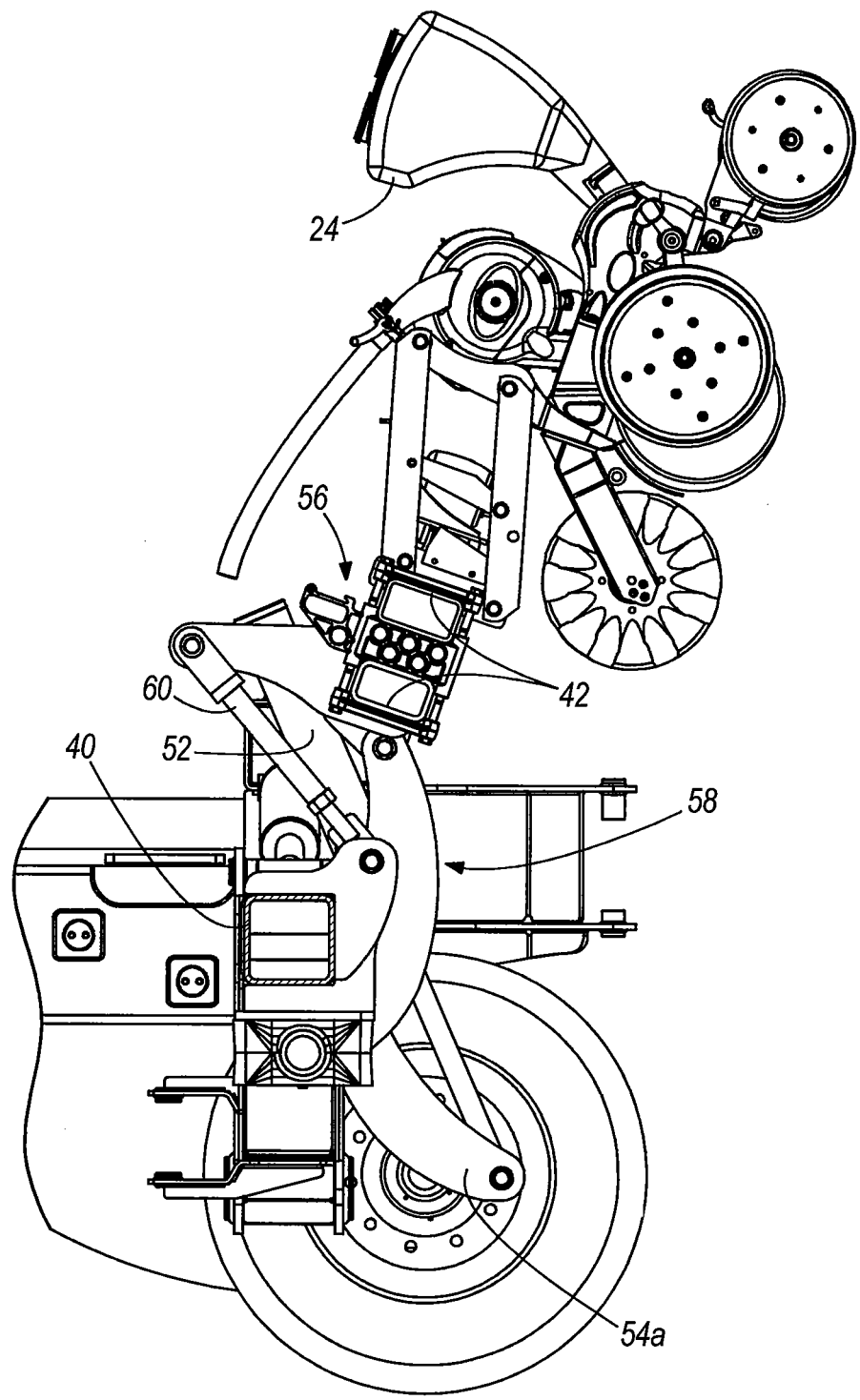
Figure 13:
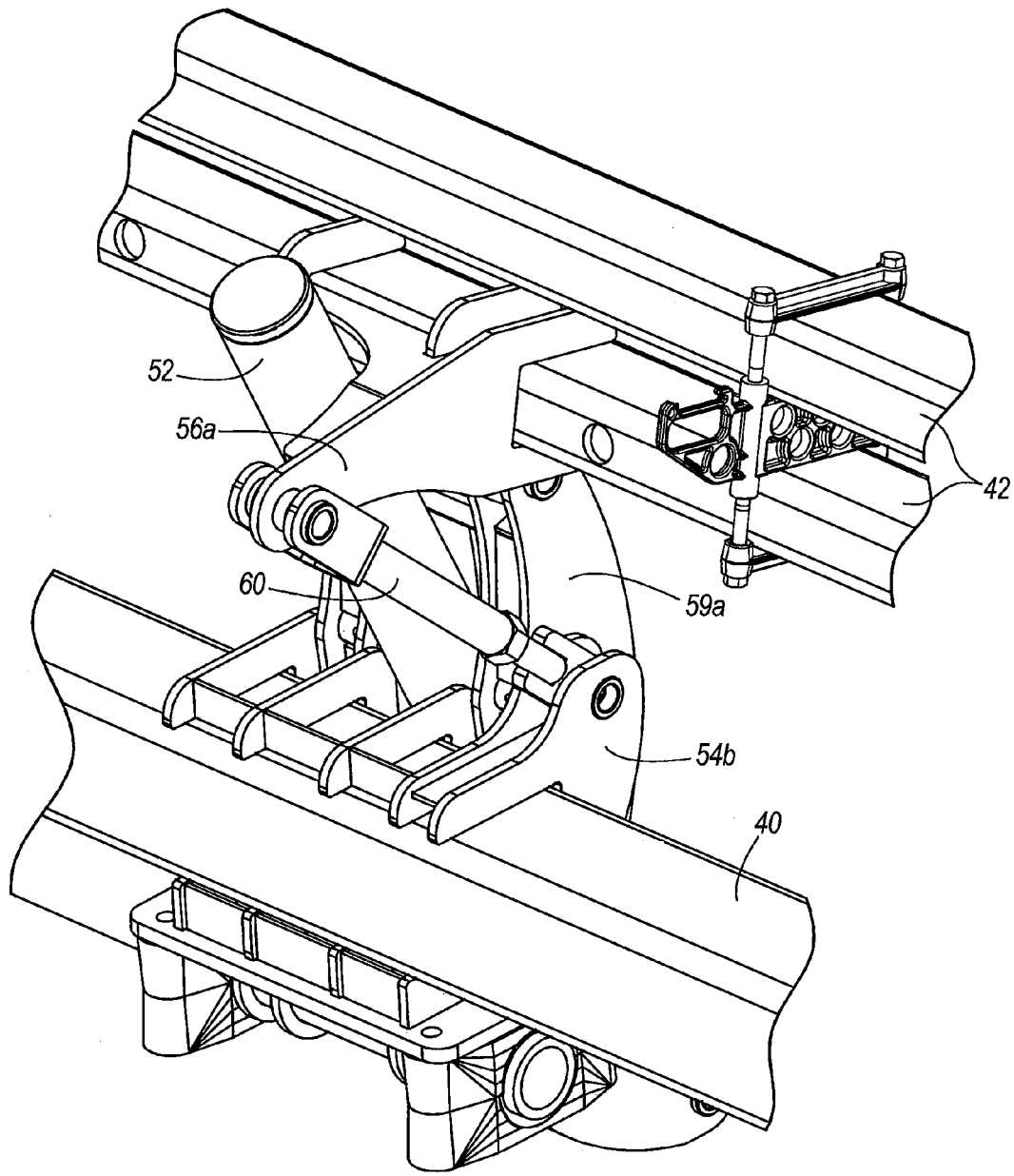
FIG. 13 is a close-up forward perspective view of the pivoting coupling between forward and aft bars, where the row units are in a fully upraised and rotated position for transport of the planter.

FIG. 11 shows aft bar 42 and row units 24 attached thereto further elevated and rotated by further extension of the hydraulic cylinder 52. During rotation of the aft bar 42 relative to forward bar 40, first arm 58 is under increasing compression and second arm 60 is under increasing tension as the aft bar 42 and row units 24 are further elevated and rotated. As the aft bar 42 approaches, a fully upraised transport position, the longitudinal axes of the first and second arms 58, 60 intersect or overlap one another, and the aft bar 42 undergoes minimal translation and substantial rotational displacement. FIGS. 12 and 13 illustrate the position and orientation of the various components of the planter in the full up, or transport position upon further extension of the hydraulic cylinder 52. In the exemplary embodiment shown in FIGS. 12 and 13, when the aft bar 42 is in the transport position, the row units 24 have been raised above a height of 48" to the soil and the aft bar 42 has been inclined to angle of approximately 80° relative to horizontal. However, it can be appreciated by a skilled artisan that the angular displacement of aft bar 42 in a transport position can be anywhere between 40-90° relative to horizontal. Furthermore, when in the transport position the height of the row units above the soil could be between 31"-60". Although the height above ground of the aft bar 42 does not increase substantially in proceeding from the position of FIG. 11 to the position of FIG. 12, the aft bar 42 and row units 24 have been further rotated by approximately an additional 40° in proceeding from the lower position in FIG. 11 to the transport position in FIG. 12. This limited translational and substantial rotational displacement of the aft bar 42 and row units 24 attached orients the row units 24 so as to provide a low and narrow planter profile for transport and storage. This progressive displacement between translation and rotation of the aft bar 42 when raised and lowered also arises because the distance between the aft ends of the first and second arms 58 and 60 is greater than the distance between their forward ends when the planter is in the soil engaging use configuration as shown in FIG. 9.

It is the relative lengths of the first and second arms 58, 60 and the locations at which their respective ends are pivotally connected to the first coupling bracket 54 of forward bar 40 and the second coupling bracket 56 of aft bar 42 which determine where the aft bar 42 will undergo primarily translational motion and where it will undergo primarily rotational motion as the aft bar 42 is pivotally displaced relative to the forward bar 40.

Figure 14A:
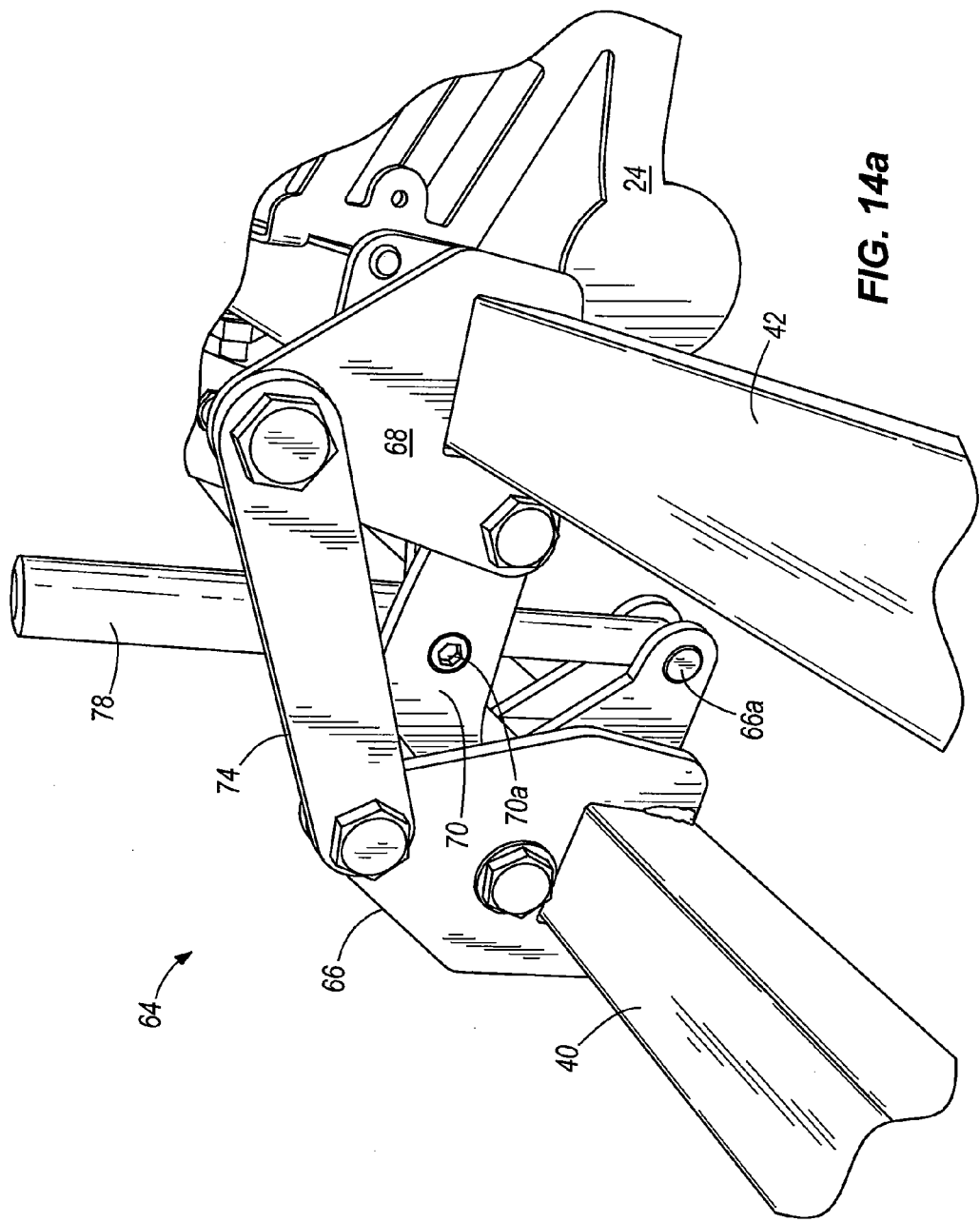
FIGS. 14a and 14b are forward and aft perspective views, respectively, of another embodiment of a pivoting coupling between forward and aft bars, with the planter units shown in a first elevated position for allowing the planter to turn in a field and in a fully upraised and rotated position for transport of the planter.
Figure 14B:
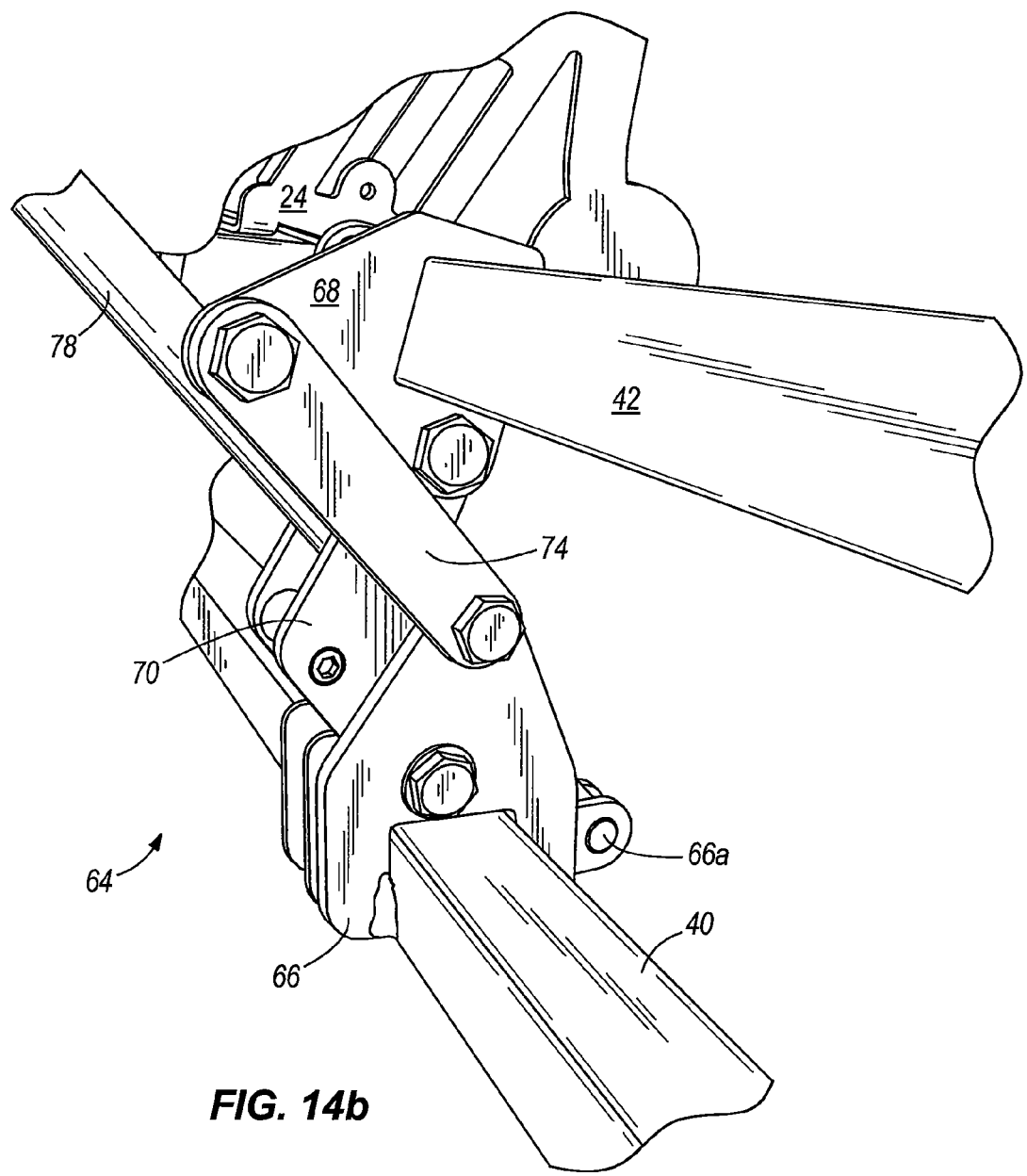

FIGS. 14a and 14b illustrate details of another embodiment of the connection of the forward and aft bars 40, 42, and the sequence of positions and orientations assumed by the aft bar 42 relative to the forward bar 40 during raising of row units (not shown in FIGS. 14a and 14b) from their position during field operation to a fully upraised and rotated position for transport. FIG. 14a is an aft perspective view of a pivoting coupler 64 attached to the forward and aft bars 40, 42 with the planter's row units in the soil engaging, planting position. FIG. 14b is an aft perspective view of the pivoting coupler 64 attached to the forward and aft bars 40, 42 with the planter's row units 24 in the fully upraised and rotated position for planter transport and storage. Pivoting coupler 64 includes a first coupling bracket 66 securely attached to forward bar 40. Pivoting coupler 64 further includes a second coupling bracket 68 securely connected to aft bar 42. First and second coupling brackets 66, 68 may be fixedly connected to a respective bar by any conventional means such as nut and bolt combinations or by weldments. Pivoting coupler 64 further includes opposing first and second lower angled arms where only the first lower angled arm is shown in FIG. 14a as element 70. First lower angled arm 70 is the same in configuration and dimensions as the second lower angled arm 72, but on the opposite side of first and second coupling brackets 66, 68. Pivoting coupler 64 will operate equally as well with a single lower arm 70 which does not have to be angled and may be linear in shape. The first and second lower angled arms 70, 72 are each provided with respective circular apertures on their forward and aft ends. This permits the forward end of the first and second lower angled arms 70, 72 to be securely coupled in a pivoting manner to the first coupling bracket 66 by means of a nut and bolt combination. Similarly, aft ends of the first and second lower angled arms 70, 72 are securely connected to the second coupling bracket 68 by a nut and bolt combination as shown in the figures. It can be appreciated by one of ordinary skill in the art that while first and second lower angled arms 70, 72 are described as being coupled to first and second coupling brackets 66, 68 by means of a nut and bolt combination, any coupling will suffice so long as first and second lower angled arms 70, 72 are coupled to first and second coupling brackets 66, 68 in a pivoting manner. The first and second coupling brackets 66, 68 are further coupled together in a pivoting manner by means of first and second upper linear arms 74 and 76, although only a single upper arm is necessary for proper operation of pivoting coupler 64. Each of the first and second upper linear arms 74, 76 is coupled to the first and second coupling brackets 66, 68 in a similar manner as first and second lower angled arms 70, 72. The first and second coupling brackets 66, 68 in combination with lower and upper arms 70 and 74 pivotally connect the forward and aft bars 40, 42 to allow the aft bar 42 to be pivotally displaced vertically with respect to the forward bar 40. Pivoting coupler 64 includes a hydraulic cylinder 78 shown in a partially extended configuration in FIG. 14a and fully extended position in FIG. 14b.

Hydraulic cylinder 78 is again disposed between the forward and aft bars 40, 42 and is pivotally connected at its rod end to first coupling bracket 66 at a pivot connection 66a, the first coupling bracket 66 being attached to forward bar 40. Hydraulic cylinder 78 is further connected at its housing to lower angled arm 70 by means of pivot connection 70a. Although this embodiment of the invention is illustrated and described as having hydraulic cylinder 78 coupled to lower arm 70, it may alternatively be connected to upper arm 74 rather than to the lower arm.

Figure 15A:
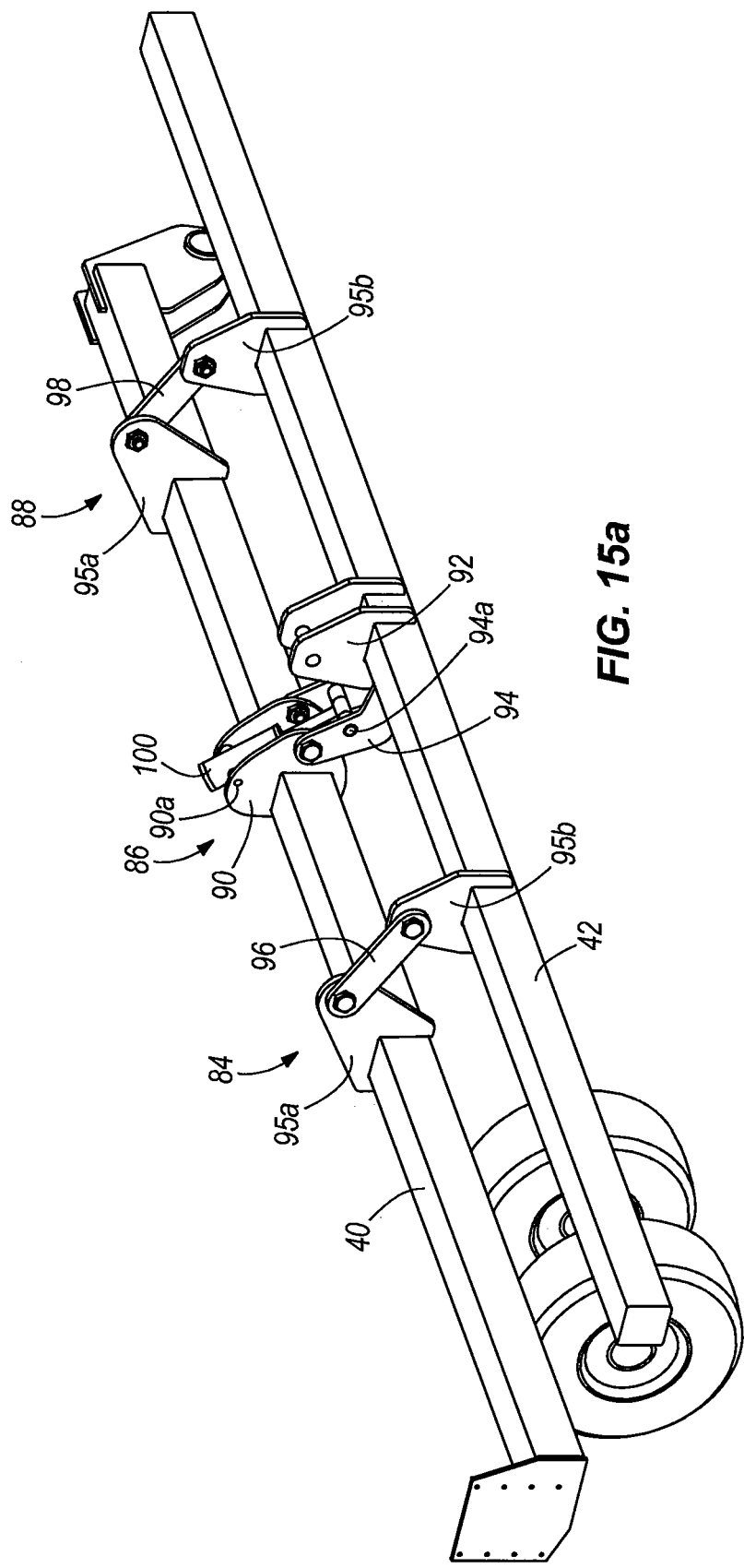
FIGS. 15a, 15b and 15c are forward and aft perspective views of another embodiment of a pivoting coupling between forward and aft bars of a wing section, with the aft bar shown in a lower, field engaging position, an elevated position for allowing the planter to turn in a field, and a fully upraised and rotated position for transport of the planter.
Figure 15B:
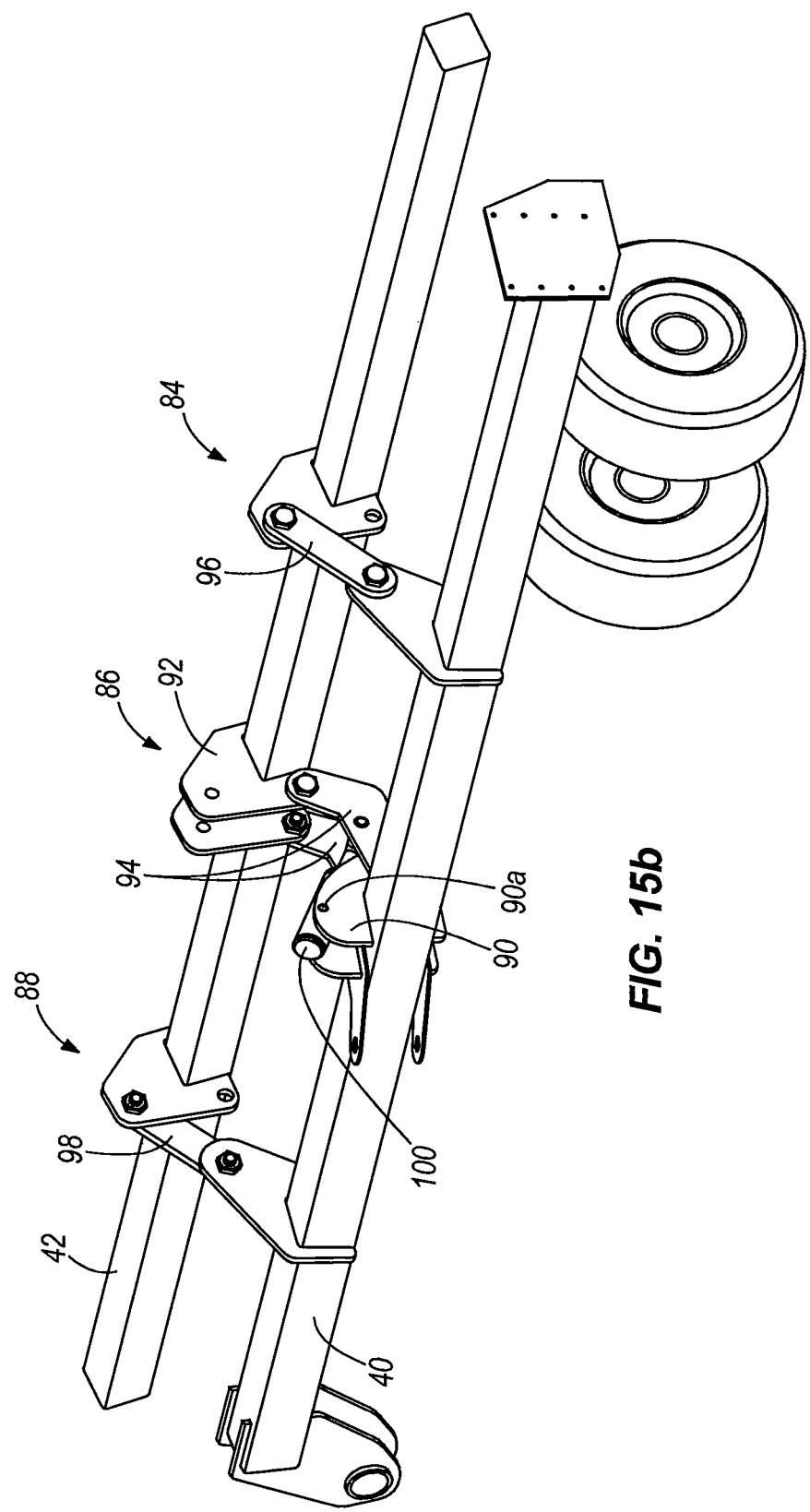
Figure 15C:
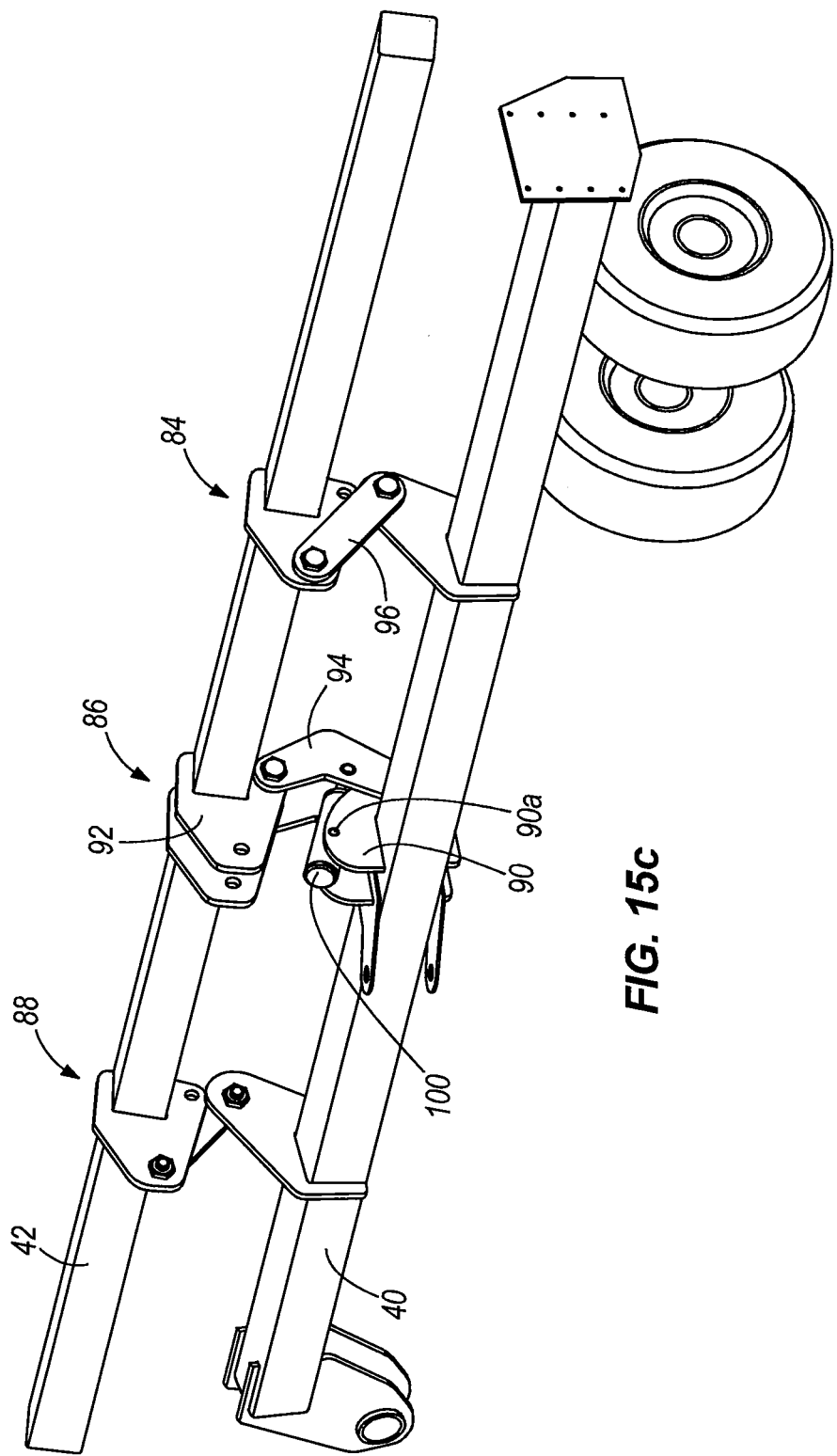

FIGS. 15a, 15b and 15c illustrate details of another embodiment of the connection of the forward and aft bars 40, 42, and the sequence of positions and orientations assumed by the aft bar 42 relative to the forward bar 40 during raising of row units (not shown in FIGS. 15a, 15b and 15c) from their position during field operation to a fully upraised and rotated position for transport. The forward bar 40 is pivotally coupled to aft bar 42 by means of a first outer coupler 84, a second intermediate, or middle coupler 86 and a third inner coupler 88. As seen in FIGS. 15a, 15b and 15c, the first outer coupler 84 is the same in configuration and operation as the third inner coupler 88, allowing and supporting rotation of the forward and aft bars 40, 42. First and third pivoting couplers are configured to have coupling brackets 95a, 95b disposed on the forward and aft bars 40, 42, respectively, and linear upper arms 96, 98 pivotally connected to said coupling brackets 95a, 95b. Thus only the configuration and operation of the middle coupler 86 will be described herein in detail. Middle coupler 86 includes a first coupling bracket 90 securely attached to forward bar 40 and a second coupling bracket 92 securely connected to aft bar 42. First and second coupling brackets 90, 92 may be fixedly connected to a respective forward or aft bar 40, 42 by conventional means such as nut and bolt combinations or by weldments. Middle coupler 86 further includes angled arms 94, where both angled arms are shown in FIG. 15b as element 94. The angled arms 94 are the same in configuration and dimensions as one another. It will be appreciated by one of ordinary skill in the art that middle coupler 86 will operate equally as well with a single angled arm 94 which does not have to be angled and may be linear in shape. The angled arms 94 are each provided with respective circular apertures on their forward and aft ends. This permits the forward end of the angled arms 94 to be securely coupled in a pivoting manner to the first coupling bracket 90 by means of a nut and bolt combination. Similarly, aft ends of the angled arms 94 are securely connected to the second coupling bracket 92 by a nut and bolt combination as shown in the figures. It can be appreciated by one of ordinary skill in the art that while angled arms 94 are described as being coupled to first and second coupling brackets 90, 92 by means of a nut and bolt combination, any coupling will suffice so long as angled arms 94 are coupled to first and second coupling brackets 90, 92 in a pivoting manner. It can further be appreciated that the first and second coupling brackets 90, 92 could be further coupled together in a pivoting manner by means of an upper linear arm, similar to the first and third pivoting couplers 84, 88. Middle coupler 86 includes a hydraulic cylinder 100, which operates the opposite of previously described embodiments. Instead of extending to raise and rotate aft bar 42, hydraulic cylinder 100 is configured to retract to achieve partially raised and fully raised aft bar 42 positions. For instance, hydraulic cylinder 100 is shown in a fully extended configuration in FIG. 15a, yet the aft bar 42 is in a lowered, ground engaging position. In FIGS. 15b and 15c, the hydraulic cylinder 100 is shown retracting, yet raising and rotating the aft bar 42. Hydraulic cylinder 100 is again disposed between the forward and aft bars 40, 42 and is coupled to forward bar 40 by means of first coupling bracket 90 at pivot connection 90a. Hydraulic cylinder 100 is further coupled at its rod end to angled arms 94 by means of pivot connection 94a.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An agricultural planter comprising:
   a frame;
   at least one toolbar, wherein the toolbar includes first and second parallel bars, the first bar being coupled to the frame, and wherein the toolbar further includes first and second arms pivotally coupling its first and second parallel bars; and
   an actuator coupled to one of the first and second arms in the toolbar for raising and rotating the second bar relative to the first bar to a first position, and for further raising and rotating the second bar relative to the first bar to a second position;
   wherein the first or second arm is non-linear;
   wherein one of the first and second arms is configured as a pair of elongated support members, said members pivotally coupling the first and second parallel bars; and
   wherein the actuator is pivotally coupled at one end to a mounting member extending from the first bar and disposed between and pivotally coupled to the support member at a location away from the one end.

2. The agricultural planter of claim 1 wherein the actuator is disposed between the first and second parallel bars.

3. The agricultural planter of claim 1 wherein the first and second arms are a non-parallel linkage between the first and second parallel bars.

4. The agricultural planter of claim 3 wherein the actuator is a linear actuator, the linear actuator pivotally coupled to the mounting member extending from the first bar and to one of said first and second arms and oriented substantially vertically between the first and second parallel bars.

5. The agricultural planter of claim 4 wherein the linear actuator is a hydraulic cylinder.

6. The agricultural planter of claim 5 wherein the hydraulic cylinder is pivotally coupled at a rod end to the mounting member and disposed between and pivotally coupled to the support members at a housing.

7. The agricultural planter of claim 4 wherein the hydraulic cylinder is in a contracted position while the second bar is in a planting position and wherein the hydraulic cylinder extends to raise and rotate the second bar relative to the first bar to a first position, and wherein the hydraulic cylinder further extends to further raise and rotate the second bar relative to the first bar to a second position.

8. The agricultural planter of claim 4 wherein the hydraulic cylinder is in an extended position while the second bar is in a planting position and wherein the hydraulic cylinder contracts to raise and rotate the second bar relative to the first bar to a first position, and wherein the hydraulic cylinder further contracts to further raise and rotate the second bar relative to the first bar to a second position.

9. The agricultural planter of claim 1 wherein the second bar is raised while moving between a planting position and the first position, the second bar being angularly displaced approximately 5 degrees relative to horizontal, and the second bar being further lifted and rotated while moving between the first position and second position, during which the second bar is angularly displaced approximately 80 degrees relative to horizontal.

10. The agricultural planter of claim 1 wherein the at least one toolbar includes a left toolbar and a right toolbar and wherein the left and right toolbars each include first and second parallel bars, the first bar of each toolbar being pivotally coupled to left and right portions of the frame respectively, and wherein each toolbar further includes first and second arms pivotally coupling the first and second parallel bars of each tool bar.

11. The agricultural planter of claim 10 wherein the left and right toolbars are folded forwardly from a planting position that is generally perpendicular to the frame to a transport position that is generally parallel to the frame.

12. The agricultural planter of claim 1 wherein the frame is provided with fixed ground support wheels.

13. The agricultural planter of claim 1 wherein the frame is provided with slidable ground support wheels.

14. The agricultural planter of claim 10 wherein the left and right toolbars are each provided with a ground support wheel.

15. The agricultural planter of claim 1 wherein the second bar comprises a plurality of bars connected to one another.

16. An agricultural planter comprising:
    a frame;
    left and right wings comprising left and right toolbars, wherein each tool bar includes first and second parallel bars, the first bar of each tool bar being pivotally coupled to left and right portions of the frame respectively, and wherein each toolbar further includes first and second arms pivotally coupling the first and second parallel bars of each toolbar; and
    a first actuator coupled to one of the first and second arms of the left toolbar for raising and rotating the second bar of the left toolbar relative to the first bar of the left toolbar from a planting position to a first raised position, and for further raising and rotating the second bar of the left toolbar relative to the first bar of the left toolbar to a second raised position, and a second actuator coupled to one of the first and second arms of the right toolbar for raising and rotating the second bar of the right toolbar relative to the first bar of the right toolbar from a planting position to a first raised position, and for further raising and rotating the second bar of the right toolbar relative to the first bar of the right toolbar to a second raised position;
    wherein the first or second arm is non-linear;
    wherein one of the first and second arms is configured as a pair of elongated support members, said members pivotally coupling the first and second parallel bar; and
    wherein the first actuator is pivotally coupled at one end to a mounting member extending from the first bar and disposed between and pivotally coupled to the support members at a location away from the one end.

* * * * *

UNITED STATES PATENT AND TRADEMARK OFFICE
CERTIFICATE OF CORRECTION

PATENT NO. : 8,733,256 B2  Page 1 of 1
APPLICATION NO. : 13/168619
DATED : May 27, 2014
INVENTOR(S) : Jon E. Kinzenbaw It is certified that error appears in the above-identified patent and that said Letters Patent is hereby corrected as shown below:

In the Claims

Col. 10, Claim 16, Line 55:
DELETE after parallel "bar"
ADD after parallel --bars--

Signed and Sealed this
Twenty-ninth Day of July, 2014

Michelle K. Lee
*Deputy Director of the United States Patent and Trademark Office*